United States Patent [19]

Lohr

[11] Patent Number: 5,784,967
[45] Date of Patent: Jul. 28, 1998

[54] REAR STEERING AXLE DIRECTIONAL CONTROL LINKAGE FOR ROAD VEHICLES

[75] Inventor: Robert Lohr, Hangenbieten, France

[73] Assignee: Lohr Industrie, Hangenbieten, France

[21] Appl. No.: 682,608

[22] PCT Filed: Jan. 23, 1995

[86] PCT No.: PCT/FR95/00066

§ 371 Date: Jul. 25, 1996

§ 102(e) Date: Jul. 25, 1996

[87] PCT Pub. No.: WO95/20516

PCT Pub. Date: Aug. 3, 1995

[30] Foreign Application Priority Data

Jan. 28, 1994 [FR] France ................... 94 01123

[51] Int. Cl.[6] ................... B62D 13/00
[52] U.S. Cl. ................... 105/3; 105/165; 280/442
[58] Field of Search ................... 105/165, 167, 105/168, 169, 4.4, 3; 104/304; 180/418, 420, 400, 401; 280/442

[56] References Cited

U.S. PATENT DOCUMENTS

| 2,029,540 | 2/1936 | Porteous . | |
|---|---|---|---|
| 3,322,439 | 5/1967 | Le Mmon . | |
| 3,872,794 | 3/1975 | Goode . | |
| 4,505,349 | 3/1985 | Murphy | 180/420 |
| 4,802,545 | 2/1989 | Nystuen et al. | 180/420 |
| 5,201,836 | 4/1993 | Dewitt | 280/442 |
| 5,234,069 | 8/1993 | Krone et al. | 280/442 |

FOREIGN PATENT DOCUMENTS

| 1042459 | 11/1953 | France . |
|---|---|---|
| 2405852 | 11/1979 | France . |
| 93 04731 | 4/1993 | France . |
| 3841772 | 1/1990 | Germany . |

*Primary Examiner*—Mark Tuan Le
*Attorney, Agent, or Firm*—Davis and Bujold

[57] ABSTRACT

A two-state directional control linkage (11) for controlling a steering axle, comprising a device for activating and deactivating the linkage (11) to lock the linkage in the operative position of the device and unlock it in the inoperative position thereof such that said device no longer transmits control movements. The linkage is particularly useful in public transport road vehicles.

19 Claims, 9 Drawing Sheets

REAR STEERING AXLE DIRECTIONAL CONTROL LINKAGE FOR ROAD VEHICLES

The present invention concerns a directional control linkage for a road vehicle, for example, a public urban transport vehicle.

There is currently a need for a road vehicle which can alternate on command between relying on a directional system integrated into the vehicle and a guided directional system cooperating with structures outside the vehicle, which would require less track space, particularly for turning, an important advance in cities and crowded urban areas.

Since urban centers have little terrain to spare, there is limited space for transport systems. Vehicle bodies must be streamlined to adapt to track size, and also the expanse of the entire track layout must be reduced.

To meet this need at turns and intersections, engineers have conceived a design which allows vehicles to negotiate turns and intersections within a minimum amount of space.

The theoretical minimum space requirement for turning is represented by the outline of the vertical portions of the vehicle centered on the vehicle's trajectory.

The projecting vehicle extremities extend beyond this outline.

The general aim of the present invention is to reduce the amount of track required for a public transportation vehicle to operate, especially vehicles which do not have guide structures, and also to provide a control means for switching to a less restricted directional control mode, and vice versa.

Another aim of the invention is to provide a directional control linkage system which can be quickly and easily switched to another directional control linkage system.

Moreover, when not operating on guided tracks, the vehicle can automatically alternate, on command, between an integrated directional system and a semi or totally rail-guided system using guide wheels.

A preferred application of the invention, but not an exclusive one, is for articulated public urban transport road vehicles, consisting of several cars or modules interconnected with intermediate means supported by a steering axle.

The applicant has already proposed an oblique rod connection between passenger modules for one known type of vehicle. This invention is described in French Patent No. 93 04731, filed Apr. 19, 1993.

According to this invention, independent intermediate modules form a composite connection between the passenger modules of a single public transportation vehicle. The articulated intermediate modules are composed of a turning unit supported by a steering axle, with the unit articulated on one side to a front module by an articulation with three degrees of mobility, and on the other side, to a rear module by a double connection formed of a lower articulation and an upper articulated connector with controlled displacement.

According to an equivalent variation of this invention, the turning mechanism is connected to the front module by a lower articulation with three degrees of mobility and to the rear module by an articulation with two degrees of mobility. The lower articulations are completed by an upper articulation with crossed rods connecting the two coach structures. The upper oblique connection is the coach structure of the intermediate module.

The oblique connection using rigid rods of constant length gives this embodiment the ability to behave almost like a single-track guided vehicle when turning. This characteristic is called "quasi single-track" in the description.

The invention has specific means for achieving these goals.

For this purpose, the invention provides a directional control linkage for a rear steering axle road vehicle using a mechanical direction indicator characterized by being articulated to both a front steering element and to a rear turning control element of a rear steering axle, and comprising a switching device with a movable element, an element for locking said element in the reference position, a means for unlocking it, and a means for replacing the movable element in the reference position, so that the directional control linkage has two states:

an active state, when the switching device is active and maintains the movable element locked in the reference position, while the directional control, which remains locked, controls the orientation of the rear steering axle; and a passive state when the switching means is passive, a state in which it is unlocked and allows the movable element to move, with the directional control linkage unlocked and no longer controlling the orientation of the rear steering axle.

The technical features and other advantages of the invention are enumerated in the following description, offered by way of a non-limiting example of one embodiment, with reference to the accompanying drawings, in which.

The general concept of this invention consists of providing a means whereby a vehicle can switch from a directional mode using no external directional force on the rear axle, to a directional mode using external directional force on the rear axle.

Thus, the general inventive principle consists of releasing the directional control at a given instant using outside intervention. This would permit another means of directional control to be used, for example, a directional system using a guide wheel or wheels.

As shown in the drawings, the directional control system according to the invention applies to various types of road vehicles, whether consisting of several connected modules or a simple dual axle vehicle with rear steering.

Without limiting the scope of the invention, several applications will be described, such as modular interconnected vehicles consisting of several modules which may be self-supporting, and a self-contained, non-articulated vehicle.

Reference is made first to FIGS. 1 through 4 showing a first series of variations.

The applications in this category concern articulated vehicles formed of a succession of modules, with the front module 1 and the rear module 2, separated by an intermediate module 3 supported by a directional axle 4 with two wheels 5 and 6. The intermediate module is connected to the adjacent modules by a front articulation 7 and a rear articulation 8. The articulations are simple articulations which pivot two degrees on a vertical axle, or which pivot three degrees on a Cardan joint.

The directional control linkage according to the invention extends between a front articulation point 9 on the front module and a rear articulation point 10 on the next module.

Here, the directional control linkage according to the invention is rectilinear and oblique. It is in the general form of a rod 11 with a front shaft 12, a rear shaft 13, and a body 14.

One of rods 12 or 13 is axially movable in relation to the other on command.

In accordance with the invention, the directional control linkage has a device 15 for activating and deactivating the linkage. This device is enclosed in body 14, serving as the activating/deactivating means. The purpose of this device is, in the blocked or active state, to integrally transmit the movement received from the front module and, in the unblocked or deactivated state, to cut the transmission of movements and absorb movement into its body. Thus, the linkage is locked in the active state, and unlocked in the deactivated state.

The movable element in the linkage system is displaceable between a reference position and two extreme positions, symmetrical with the reference position, corresponding to the two maximum symmetrical turning positions on either side of the road vehicle.

These general considerations apply to the entire invention.

The activator/deactivator device will be described below.

To simplify matters, it will be referred to as the switching device.

Figure 1:
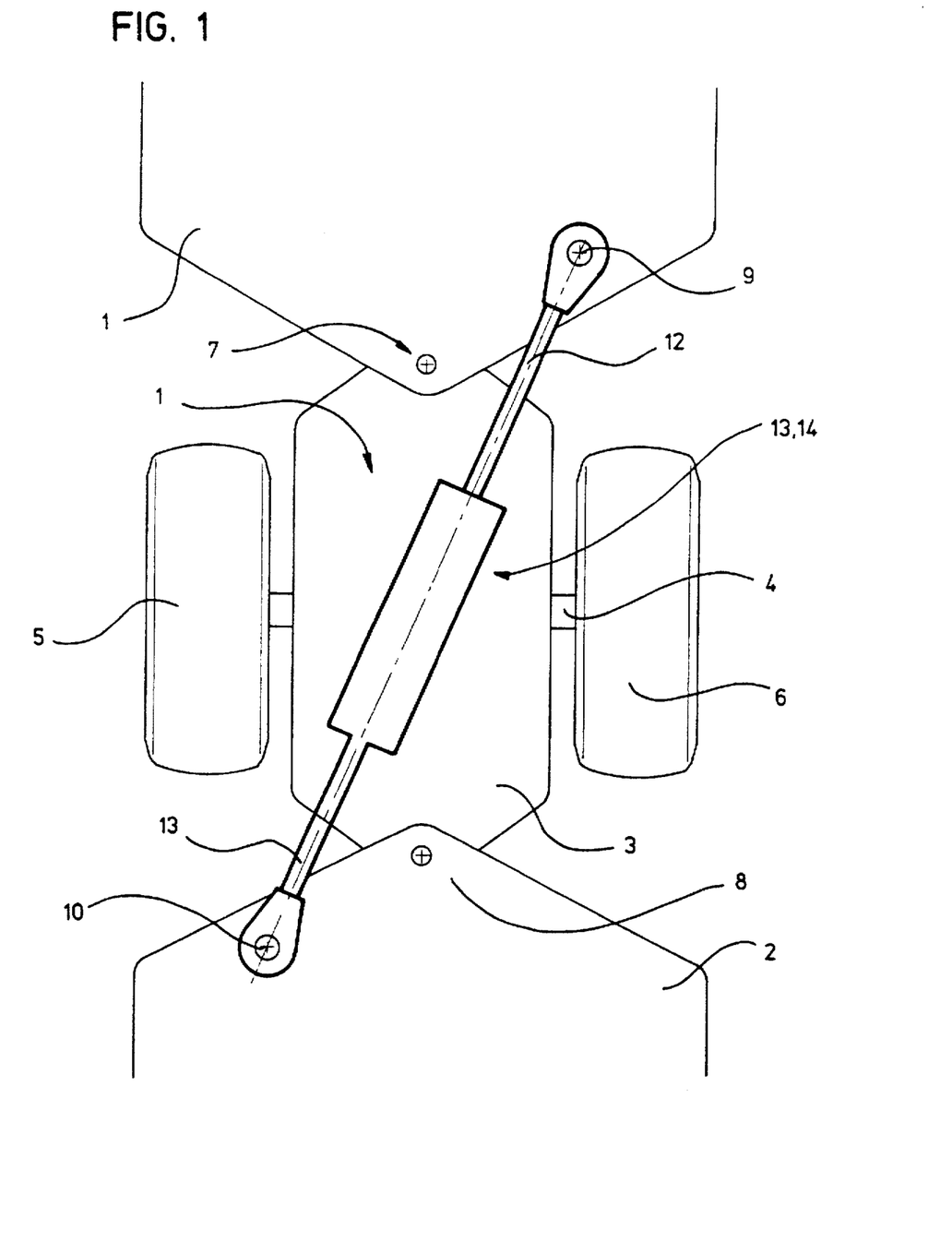
FIG. 1 is a perspective plan view of the basic version with oblique rods on the intermediate module.
Figure 2:
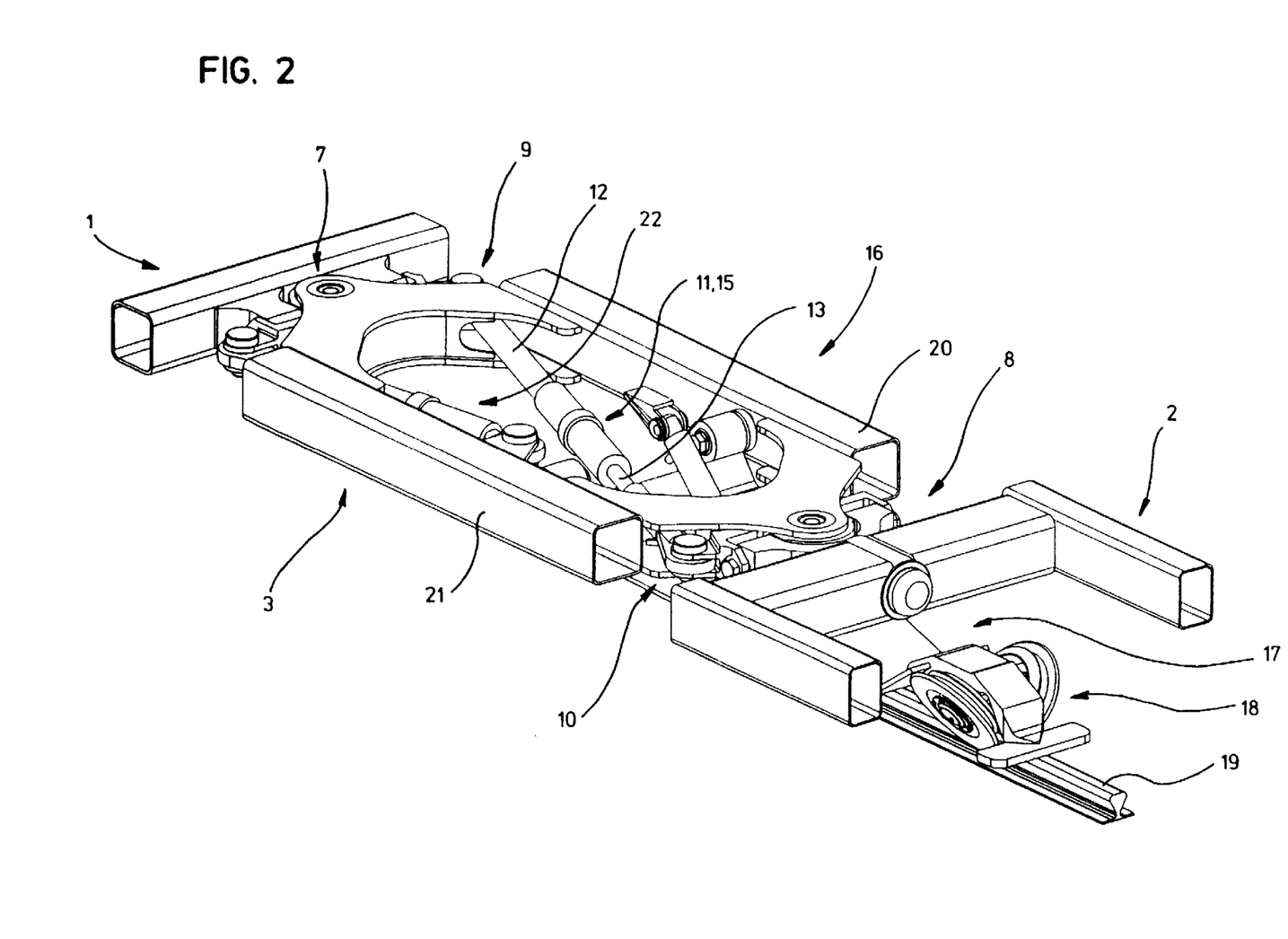
FIG. 2 is a perspective view of the same version used on a road vehicle, articulated to an intermediate module cooperating alternatively with a lifting guide wheel arm.

The variation described here is also shown in FIG. 2 with some additions. This drawing provides an actual, practical application of the invention.

Note in this drawing the generally rod-like oblique directional linkage 11, obliquely articulated between two front and rear articulations 7 and 8 through chassis 16 of intermediate module 3. A lifting directional arm 17 is associated therewith, with its head 18 subject to directional displacement along guide rail 19. Said arm 17 is pivotably attached to side elements 20 and 21 of chassis body 16, for example, by the ends of shafts integral with side elements 20 and 21, as shown. Thus, when directional arm 17 is functioning, it serves as the steering mechanism for intermediate module 3, with guide rail 19 imposing and regulating direction.

In accordance with the invention, and in all the embodiments, this arm functions only when the directional control linkage is deactivated.

It is only one example which illustrates the guide means.

Also note in this drawing a device 22 for limiting lateral movement pivotably attached between one of the two side elements of chassis 16 of the intermediate module and front articulation 7. This limiting device 22, used in association with other means, limits lateral deviation and aids realignment.

The single limiter can be replaced by a pair of longitudinally disposed limiters symmetrical to the center of the chassis and articulated between the front or rear articulations and the corresponding side element 20 or 21 of chassis 16 of intermediate module 3.

Next, the variations shown in FIGS. 3 and 4 will be described.

These variations are distinguished from the first variation in that the rear articulation point on the rear module is an intermediate articulation point 23 or 24, which is movable when unlocked, and in that the switching means 15, also generally in the form of a rod 11, is articulated between said intermediate movable articulation point 23 or 24 and a stationary point 25 or 26, which is the exact point where the free end of switching means 15 is attached.

Figure 3:
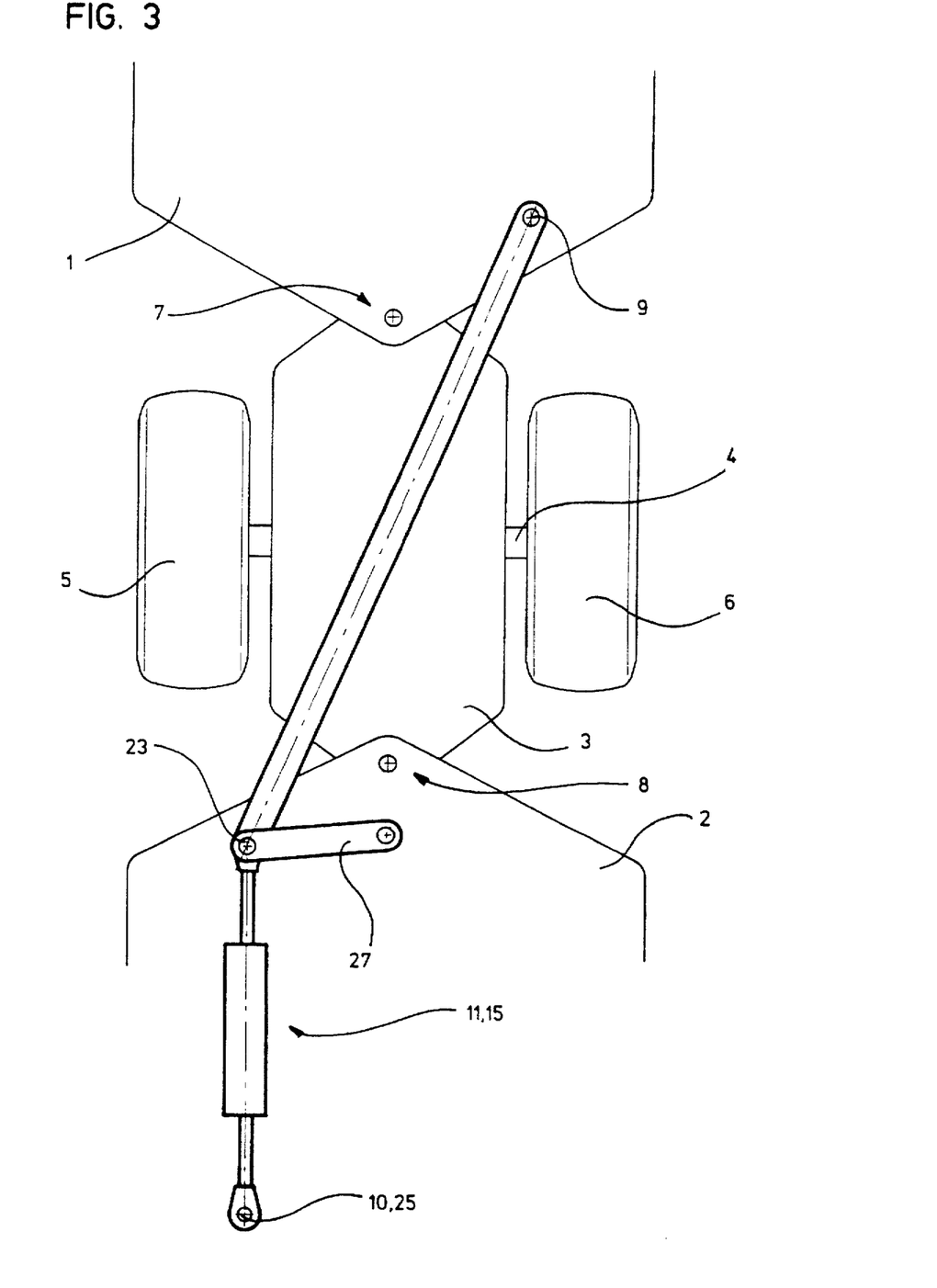
FIG. 3 is a plan view of a version with oblique rods and a lever on the intermediate module.

According to the variation shown in FIG. 3, movable intermediate articulation point 23 is guided by a pivoting lever 27 which makes it move in a circular trajectory around a central position, and in addition, the switching means 15 is longitudinally disposed, that is, in the axle of the next module, and its free end is articulated around a fixed point 25.

Figure 4:
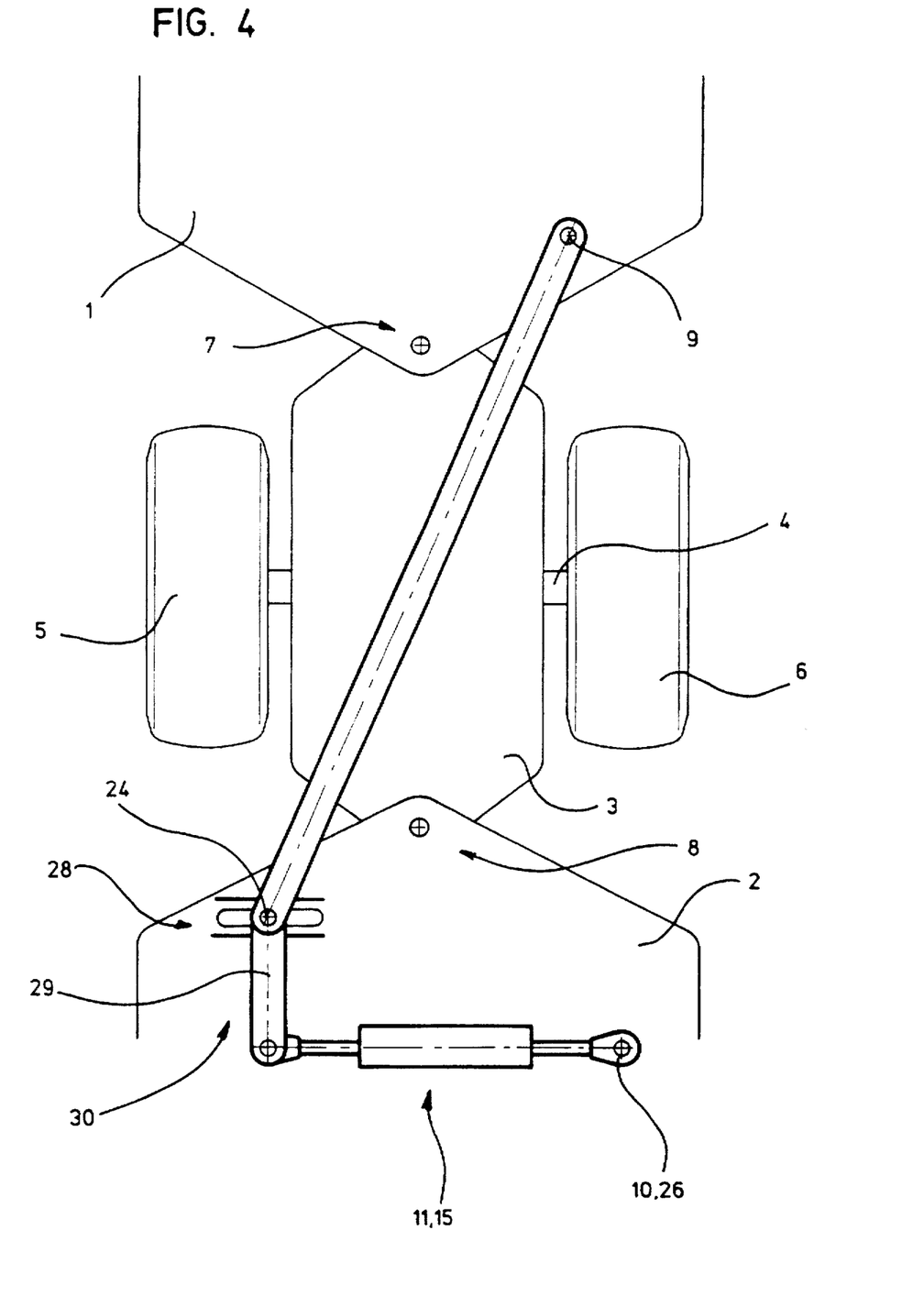
FIG. 4 is a plan view of a version with oblique rods and rails on the intermediate module.

According to the variation shown in FIG. 4, movable intermediate articulation point 24 is subject to displacement along a transverse opening 28 or along a transverse element on the next module. This intermediate articulation point is articulated to the switching means by a return lever 29 which, with the movable shaft of the switching means, forms a non-deformable square 30. The switching means is disposed transversely to the module and its free end is articulated around a fixed point 26.

Figure 5:
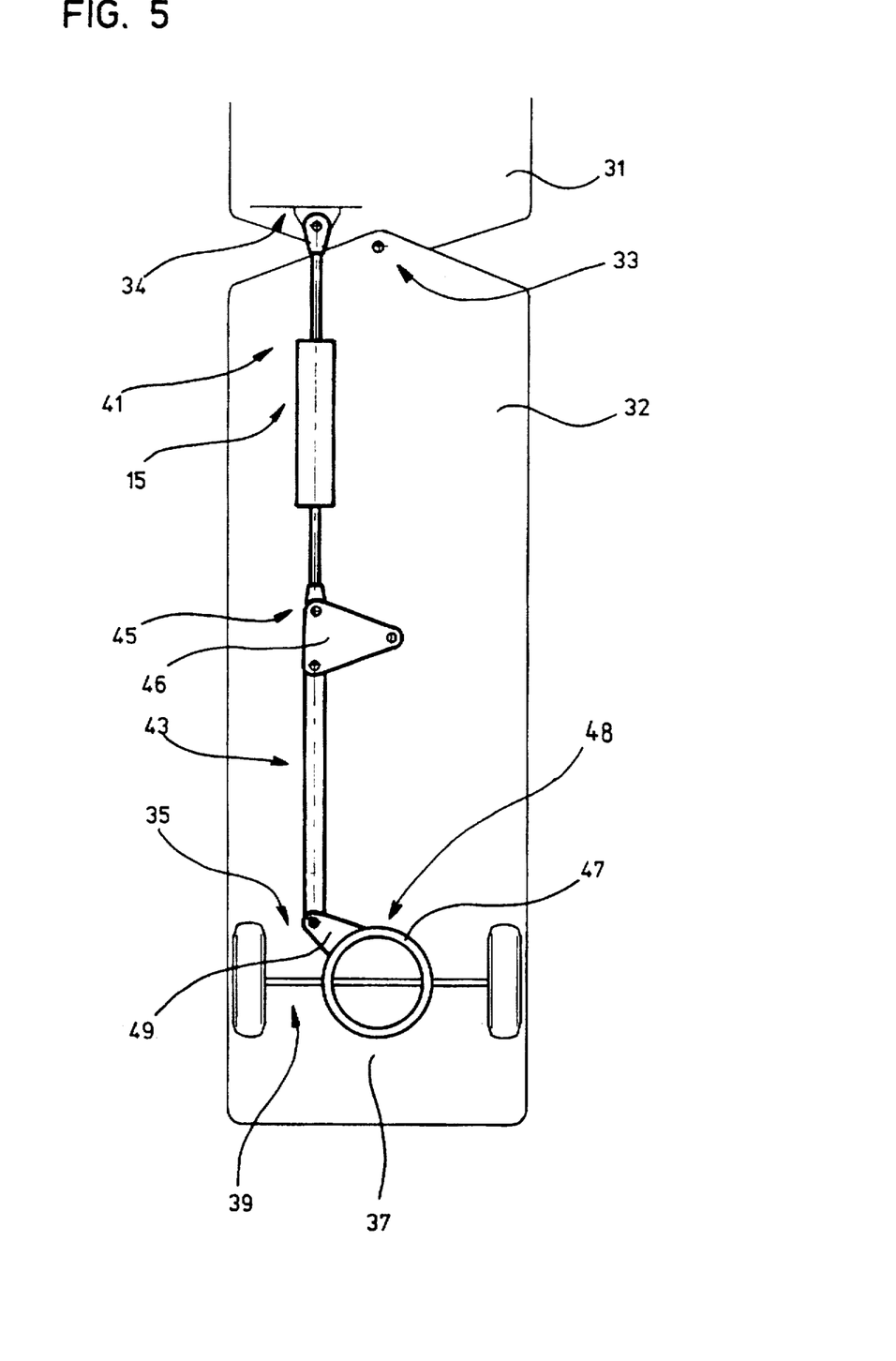
FIG. 5 is a plan view of a version of a rear wheel drive axle with a rounded front portion.
Figure 6:
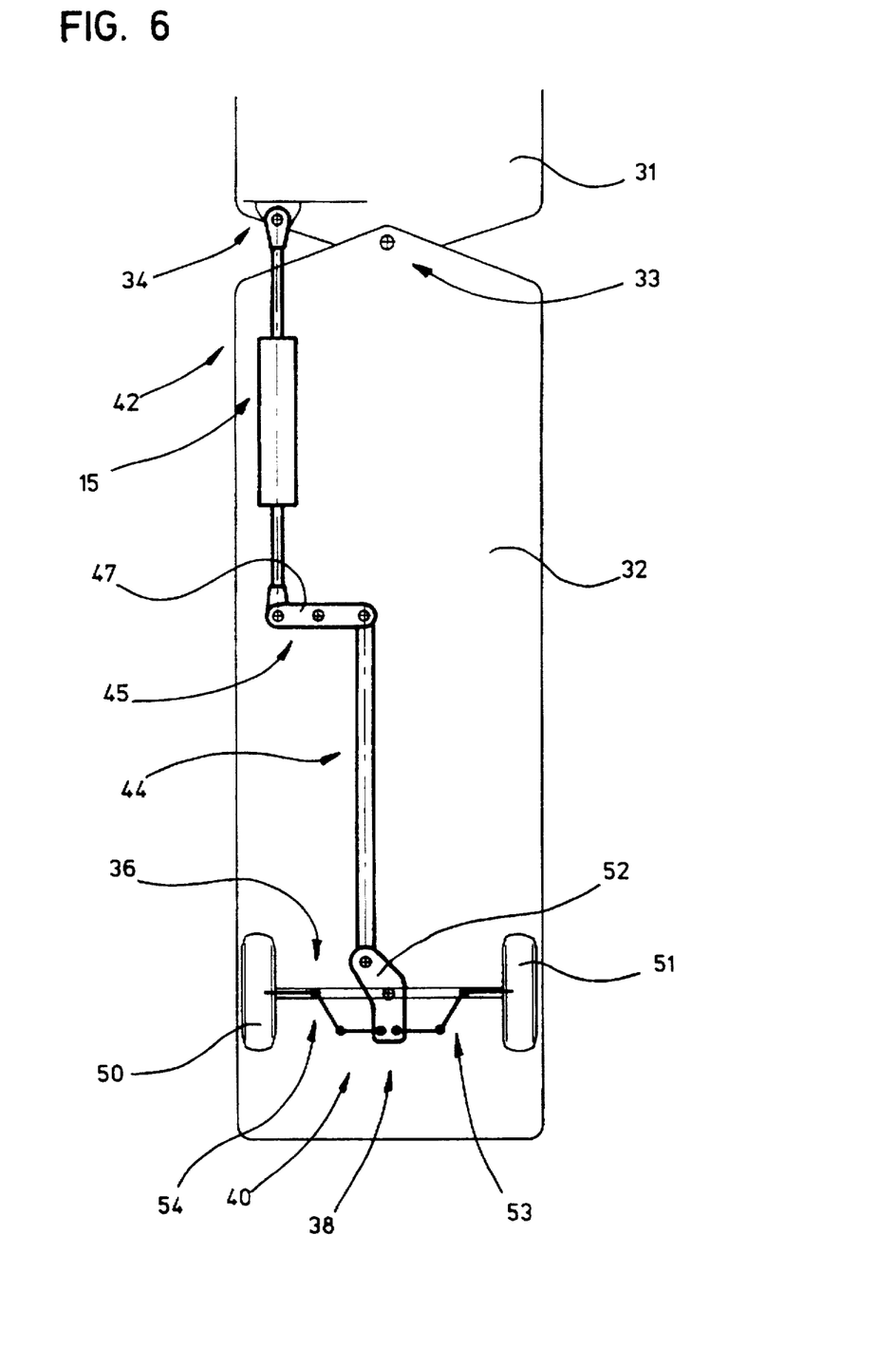
FIG. 6 is a plan view of a version of a rear wheel steering unit with directional bearings.

The variations shown in FIGS. 5 and 6 concern a front module 31 and a rear module 32 connected by a single lower articulation 33, with no intermediate module.

According to these variations, the directional control linkage according to the invention has a first extremity 34 articulated to a fixed point on the back of front module 31, and a second extremity 35, 36 articulated to the directional mechanism 37, 38 of the rear steering mechanism 39,40.

Each of these variations comprises in series in the linkage system, a switching device 15 on a first branch 41, 42, articulated to a second branch 43, 44 on a rocker element 45 that is symmetrical on both sides with a neutral median position. Depending on the case, the rocker element may be a triangular piece 46 with a pivoting upper extremity, or an articulated lever with a central pivot 47, as shown in FIGS. 5 and 6, respectively.

The directional mechanism of rear steering axle 39, 40 varies according to the type of steering.

In the case of a directional axle 39 with a round front element (FIG. 5), it consists of a simple lever 49 integral with the round element.

In the case of a rear axle 40 with wheels 50 and 51 on directional axles, the mechanism is a pivoting central plate 52 activating a right rod 53 and a left rod 54 representing the steering mechanism.

Figure 7:
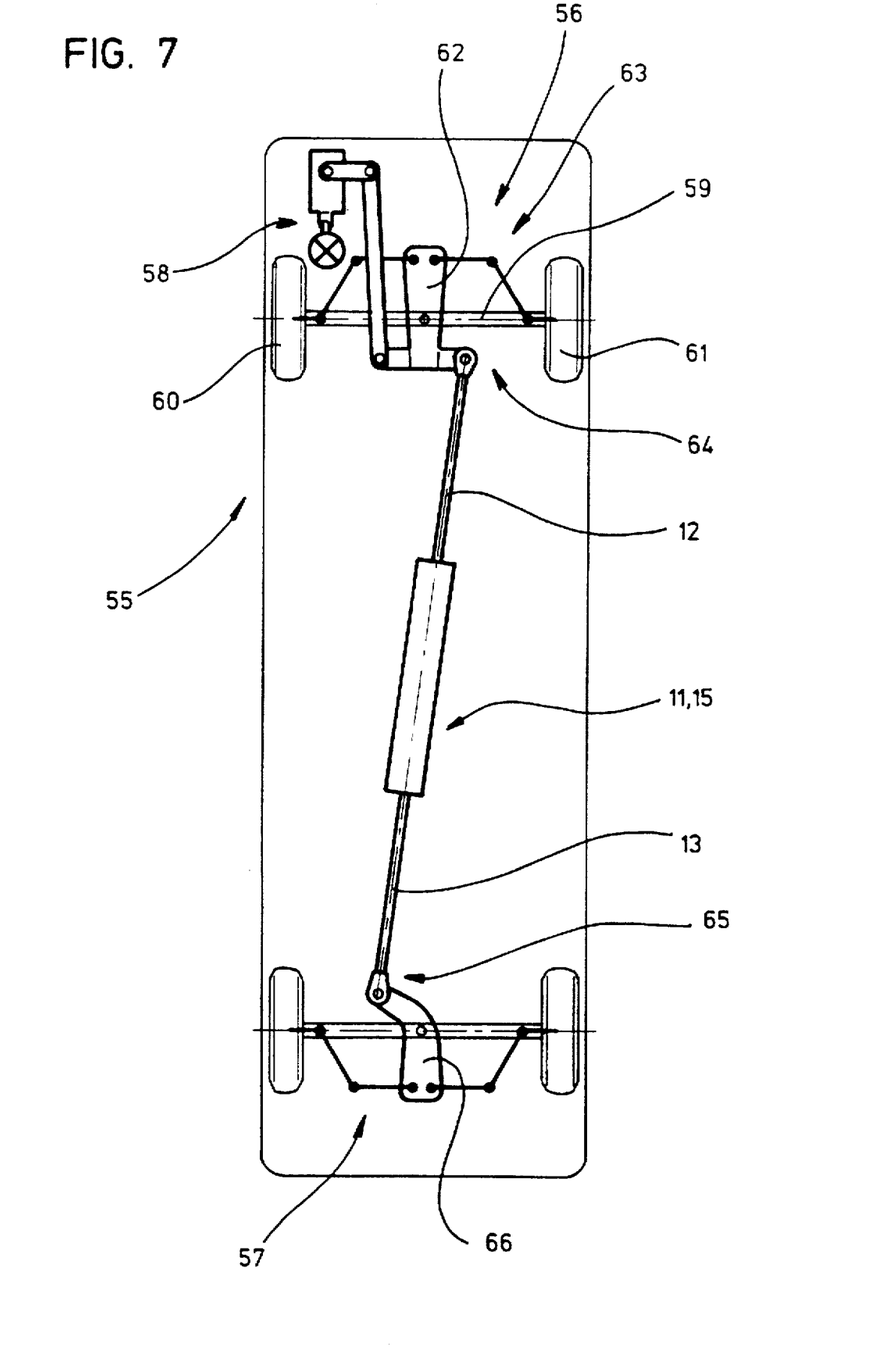
FIG. 7 is a plan view of a vehicle with a rear directional control unit according to the present invention.

The variation in FIG. 7 shows a version of the device used with vehicles consisting of one car 55 comprising a front steering mechanism 56 and a rear steering mechanism 57, which may have directional shafts.

The system of the present invention provides either active or passive directional control on command using either front directional mechanism 56 or rear directional mechanism 57.

Front directional mechanism 56 is composed of a directional flywheel 58, a supporting axle 59, and two directional wheels 60 and 61 directionally activated by a front pivoting plate 62 articulated to each of the front directional wheels by a steering mechanism 63.

The control linkage according to the invention extends from an articulation point 64 on front pivoting plate 62 to an articulation point 65 on a rear pivoting plate 66.

In any of these variations, switching device 15 may function according to various techniques: mechanical, electromechanical, hydro-mechanical, or some other technique. Its general purpose is to provide two functional modes, locked and unlocked, to alternate on command between the two, and to identify the locked position before switching into the locked position.

Figure 8:
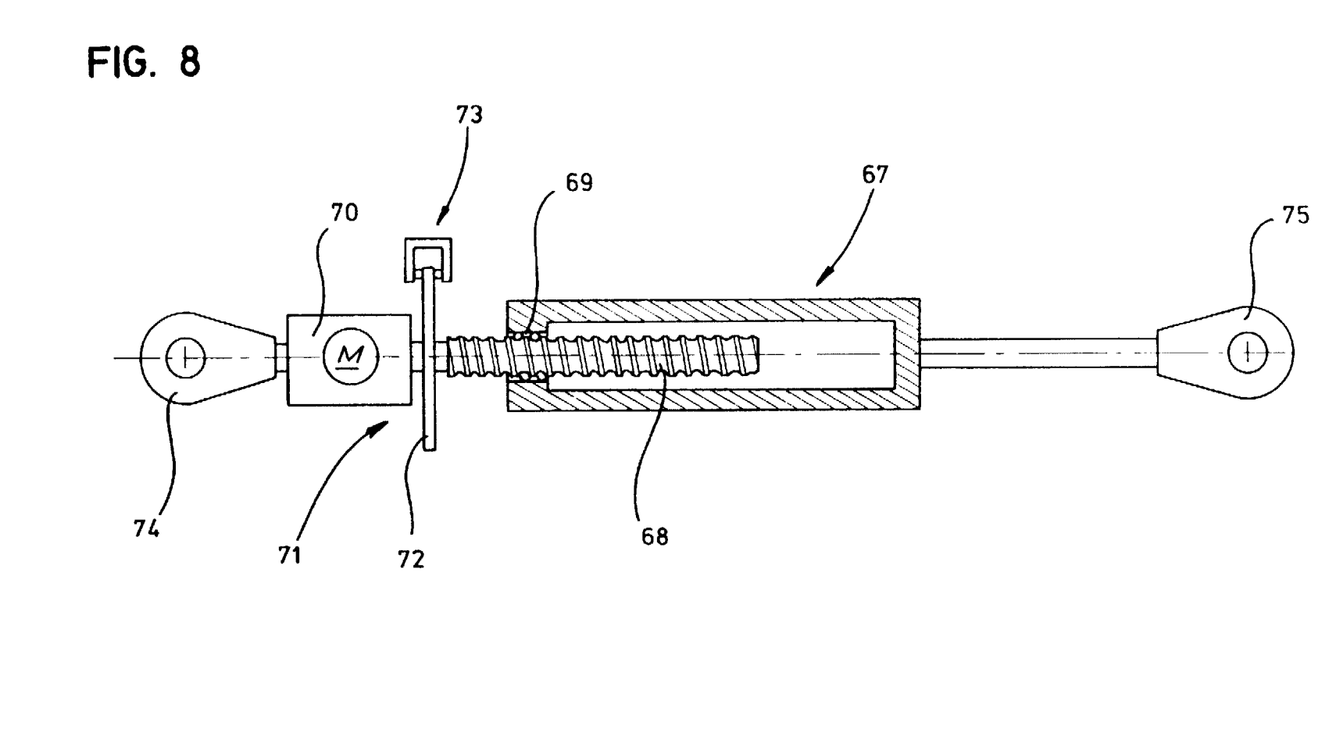
FIG. 8 is a longitudinal cross-section of the mechanical deactivator.
Figure 9:
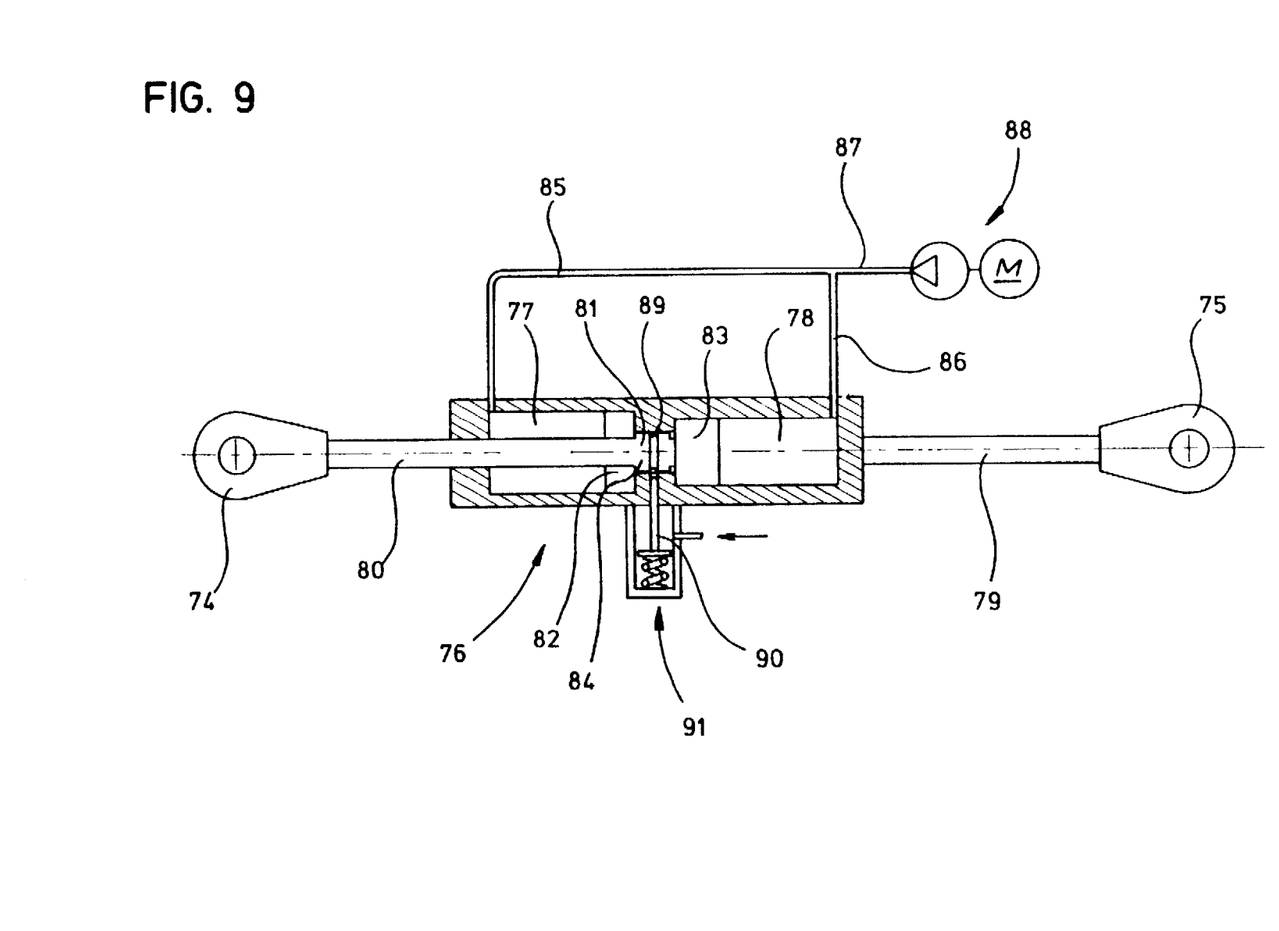
FIG. 9 is a longitudinal cross-section of a hydro-mechanical deactivator.

FIGS. 8 and 9 show two additional examples of variations.

First, the electromechanical version will be described, with reference to FIG. 8.

This device has a body 67 with a housing for an endless screw 68 traversing one of its extremities, passing through ball bearings 69, that is, bearings that allow the screw to be longitudinally displaced in a straight line, without rotating.

Here, the screw is the movable, displaceable element in the switching device.

An electric motor M or other device is attached linearly in relation to the screw at its extremity. The motor is connected to an indexing or other system (not shown) for locating the screw's precise and constant reference position, which corresponds to the locked position.

The screw is thus replaced in the reference position, or the position in which control is active.

There is a brake 71, for example a disc 72, on the screw body, held by a clamp 73. This blocks the screw in the locked position.

The generally rod-like switching device 15 has ring elements 74 and 75 at its extremities for pivotally attaching it.

The hydro-mechanical version shown in FIG. 9 has a cylinder 76 surrounding two chambers, a left chamber 77 and a right chamber 78, a stationary shaft 79 and a movable shaft 80 with a piston-like extremity 81 which can be displaced inside the shaft.

A piston 82, 83 is displaceable inside the two chambers 77 and 78 of cylinder 76. Piston 82 of the left chamber 77 slides freely on shaft 80, while piston 83 of right chamber 78 moves freely within that chamber.

Piston 83 is activated either by the end of the shaft, or by the pressure within the right chamber.

The two chambers 77 and 78 are separated by a cylindrical passageway 84, which has a diameter adapted to accommodate the piston-like shaft extremity.

The ends of chambers 77 and 78 are supplied laterally with pressurized hydraulic fluid by two distinct branches 85 and 86 merging into a single conduit 87 which is the outlet of a hydraulic unit, for example, motor-pump 88 with motor M.

Depending on the case, common conduit 87 supplying the two chambers may have a hydraulic damper, which is regulable and inactive in the unlocked state.

The piston-like extremity of movable shaft 80 has a peripheral groove 89 cooperating with a blocking pin 90 attached to a lateral locking mechanism 91 adjacent to cylinder body 76. Locking mechanism 91, to the right of passageway 84, comprises blocking pin 90. Blocking pin 90 is flexible and can be pushed, retracted or disengaged on command or by remote control. An arrow in the drawing indicates the controlled locking/unlocking motion, which may be by remote control.

The movable element of the switching device (a shaft, a screw, or the like) resumes the reference position, that is, the active control position.

Next, the function of the invention in its entirety will be explained.

Depending upon the state of the switching means, there are two principal modes.

The first mode consists of the locked linkage transmitting directional control movement, in which the device is locked and termed active. This is the directional mode.

The second mode consists of the unlocked or passive linkage phase in transmitting directional control movement, in which the device is unlocked and termed deactivated. This is the non-directional mode.

In the non-directional mode, the rear steering axle may be used in association with a guide means, for example, a lifting directional arm attached to the chassis of an intermediate module and restricted to movement along a guide rail.

Generally speaking, when the device is deactivated, the rear module or rear steering mechanism is not directional, as it is not subject to directional control by the linkage system of the invention. The rear axle, which turns freely, must be mechanically connected to a stationary structure.

Using direct or remote control, the device is activated and works for a brief preliminary period of time with the rod resuming the reference position; soon afterwards, it is ready to lock, and the linkage system will be in the proper state and at the correct length to be in directional mode.

Once it is in the reference position, the electromechanical or hydro-mechanical switching means automatically places the rod in position for displacement, as in the preceding case.

Preferably, this position will be the mid-point along the path of the movable element of the switching means in the deactivated state, so as to reduce the number of displacements required to activate the directional control linkage and switch quickly from one mode to the next.

This is the sequence followed in the locking phase, that is, using a brake, in the electromechanical version, or engaging a locking pin in the hydro-mechanical version, to block the device in the activated position.

Changing to non-directional mode follows the reverse sequence.

A practical example of this situation is an articulated road vehicle traveling from the suburbs to the center of a city.

In the suburbs, it would travel in the integrated directional mode, that is, as a directionally controlled vehicle in the active state.

When the vehicle enters an area with narrow tracks or passageways, the driver would switch to the non-directional mode, another directional control system would take over, and it would behave like a rail-guided vehicle.

Since the directional control linkage system is locked, the vehicle behaves nearly like a single-rail guided road vehicle.

Conversely, when the vehicle leaves the center of the city, the driver can switch to the integrated directional mode with a simple command. The movable interior element in the device quickly resumes the reference position and will lock as soon as all the positions coincide.

I claim:

1. A directional control linkage in combination with a road vehicle having a front steering module and at least one rear module each being connected to one another by articulated connections to an intermediate module, said intermediate module having an axle supporting a pair of wheels, and said directional control linkage being provided for selectively transmitting directional control from said front steering module to said rear module of said road vehicle;

said directional control linkage being articulated at one end thereof to said front steering module and being articulated at an opposite end thereof to said rear module, without being articulated to any intermediate module, to facilitate selective directional control of said rear module;

said directional control linkage further comprising a movable element, which is movable relative to a portion of said directional control linkage, and a locking mechanism for locking said movable element in a reference position, an unlocking mechanism for unlocking said movable element, and active means for returning said movable element to the reference position, and said directional control linkage having:

an active state in which said movable element is maintained locked in the reference position and facilitates control of an orientation of said rear module;

a passive state in which said movable element is in the unlocked position and moves relative to said portion of said directional control linkage to interrupt control of said rear module; and an intermediate state in which said active means returns said movable element to the reference position.

2. The invention according to claim 1, wherein said directional control linkage is controlled electromechanically.

3. The invention according to claim 2, wherein the electromechanically controlled directional control linkage comprises:

a housing supporting a rotatable screw, one end of said screw forming a second extremity of said movable element and extending outside said housing, and said one end carrying a brake with a blocking disc; and a motor is connected to said one end of said screw for facilitating rotation thereof and desired movement of said movable element.

4. The invention according to claim 1, wherein said front steering module is articulated, at a rear extremity thereof, to a front extremity of said intermediate module, and said rear module is articulated, at a front extremity thereof, to a rear extremity of said intermediate module, and said intermediate module has a steering mechanism.

5. The invention according to claim 1, wherein said directional control linkage comprises a shaft connected to a body, and a first end of said movable element is received by said body.

6. The invention according to claim 1, wherein said directional control linkage has a mechanism for returning said movable element to the reference position when switching from the passive state to the active state.

7. The invention according to claim 1, wherein said directional control linkage is a hydro-mechanical device and said front steering module is obliquely articulated to said rear module.

8. The invention according to claim 7, wherein said hydro-mechanical device consists of left and right chambers which are both enclosed in a cylinder and communicate with one another via a passageway, said left and right chambers are supplied with pressurized fluid through respective left and right inlets which are each connected with a common conduit communicating with a fluid supply unit, and said movable element is displaced along said left and right chambers, said movable element has a piston shaped head which is sized to slide within to said passageway, and said movable element cooperates with at least one of a left slidable piston which is displaceable within said left chamber and a right slidable piston which is displaceable within said right chamber, and a blocking mechanism is selectively couplable with said piston shaped head to block movement of said movable element.

9. The invention according to claim 8, wherein said blocking mechanism has a pin which, when displaced, immobilizes said piston shaped head and maintains said movable element in the reference position.

10. The invention according to claim 8, wherein said supply conduit, common to both said left and right chambers, comprises a regulatable hydraulic damper.

11. The invention according to claim 1, wherein, when said directional control linkage is in the passive state, said rear module mechanism is controlled by a retractable guide mechanism cooperating with a guide rail.

12. The invention according to claim 4, wherein said retractable guide mechanism is a retractable directional arm supported adjacent a leading portion of said rear module.

13. The invention according to claim 1, wherein, when said directional control linkage is in the passive state, said movable element is displaced between the reference position and first and second extreme positions, symmetrical with respect to the reference position, which correspond to first and second symmetrical maximum turn positions of said road vehicle.

14. The invention according to claim 11, wherein a limiting device interconnects one of said front module and said rear module with said intermediate module to limit lateral deviation.

15. The invention according to claim 1, wherein said directional control linkage is articulated to said front module via a moveable intermediate articulation point which is guided by a pivot lever which is articulated to said rear module.

16. The invention according to claim 1, wherein said directional control linkage is articulated to said front module via a movable intermediate articulated point which is displaceable along a transverse opening provided in said rear module.

17. A directional control linkage in connection with a road vehicle comprising:

a moveable element which selectively transmits directional control to one of a rear module and a rear steering mechanism of said road vehicle;

said vehicle having a front steering module being connected to one of said rear module and said rear steering mechanism by a connection;

said vehicle further comprises said moveable element articulated to said front steering module and one of said rear module and said rear steering mechanism to control the orientation of one of said rear module and said rear steering mechanism;

said moveable element includes a locking means for locking said movable element in a reference position; unlocking means for unlocking said movable element; and active means for returning said movable element to the reference position so that said directional control linkage further comprises;

an active state in which said movable element is locked in said reference position in which said control linkage is operative for controlling said orientation of one of said rear module and said rear steering mechanism;

a passive state in which said moveable element is in the unlocked position in which said control linkage is one of interrupted and inactive whereby said movable element is displaceable thereby preventing controlling of said orientation of one of said rear module and said rear steering mechanism; and an intermediate transition state, between said passive state and said active state, during which said active means replaces said movable element in said reference position.

18. The invention according to claim 17, wherein the connection between said front steering module and one of said rear module and said rear steering mechanism is via one of a pivoting articulation and an intermediate module, and the intermediate module has an axle supporting a pair of wheels.

19. A directional control linkage in combination with a road vehicle having a front steering module and a rear steering mechanism each being connected to one another by articulated connections to said directional control linkage, and said directional control linkage being provided for selectively transmitting directional control from said front steering module to said rear module of said road vehicle;

said directional control linkage being articulated at one end thereof to said front steering module and being articulated at an opposite end thereof to said rear steering mechanism to facilitate selective directional control of said rear steering mechanism;

said directional control linkage further comprising a movable element, which is movable relative to a portion of said directional control linkage, and a locking mechanism for locking said movable element in a reference position, an unlocking mechanism for unlocking said movable element, and active means for returning said movable element to the reference position, and said directional control linkage having:

an active state in which said movable element is maintained locked in the reference position and facilitates control of an orientation of said rear steering mechanism;

a passive state in which said movable element is in the unlocked position and moves relative to said portion of said directional control linkage to interrupt control of said rear steering mechanism; and an intermediate state in which said active means returns said movable element to the reference position.

* * * * *